United States Patent [19]

Castleberry

[11] Patent Number: 4,904,056
[45] Date of Patent: Feb. 27, 1990

[54] LIGHT BLOCKING AND CELL SPACING FOR LIQUID CRYSTAL MATRIX DISPLAYS

[75] Inventor: Donald E. Castleberry, Schenectady, N.Y.

[73] Assignee: General Electric Company, Schenectady, N.Y.

[21] Appl. No.: 384,929

[22] Filed: Jul. 25, 1989

Related U.S. Application Data

[63] Continuation of Ser. No. 240,366, Aug. 30, 1988, abandoned, which is a continuation of Ser. No. 756,909, Jul. 19, 1985, abandoned.

[51] Int. Cl.$^4$ .............................................. G02F 1/133
[52] U.S. Cl. ................................ 350/333; 350/339 R; 350/344
[58] Field of Search ............... 350/334, 337, 332, 333, 350/339 R, 339 F, 344

[56] References Cited

U.S. PATENT DOCUMENTS

| | | | |
|---|---|---|---|
| 3,824,003 | 7/1974 | Koda et al. | 350/334 |
| 3,861,783 | 1/1975 | Dill et al. | 350/334 |
| 3,862,332 | 2/1975 | Leupp et al. | 350/344 |
| 3,869,196 | 3/1975 | Kubota | 350/337 |
| 4,068,923 | 1/1978 | Toida | 350/339 R |
| 4,217,035 | 8/1980 | Doriguzzi et al. | 350/344 |
| 4,256,382 | 3/1981 | Piliavin et al. | 350/344 |
| 4,311,785 | 1/1982 | Ahne et al. | 350/341 |
| 4,422,730 | 12/1983 | Kozaki et al. | 350/339 R |
| 4,448,491 | 5/1984 | Okubo | 350/344 |
| 4,470,667 | 9/1984 | Okubo et al. | 350/344 |
| 4,514,043 | 4/1985 | Ahne et al. | 350/341 |
| 4,527,864 | 7/1985 | Dir | 350/337 |
| 4,561,725 | 12/1985 | Hotta | 350/341 |
| 4,593,977 | 6/1986 | Takamatsu et al. | 350/341 |
| 4,634,227 | 1/1987 | Nishimura et al. | 350/334 |
| 4,643,532 | 2/1987 | Kleiman | 350/343 |
| 4,668,955 | 5/1987 | Davis | 528/125 |

FOREIGN PATENT DOCUMENTS

| | | | |
|---|---|---|---|
| 0090661 | 10/1983 | European Pat. Off. | 350/334 |
| 59-143124 | 8/1984 | Japan | |
| 0164723 | 8/1985 | Japan | 350/344 |

OTHER PUBLICATIONS

"Silicon TFTs for Flat Panel Displays", by F. Morin and M. LeContellec, Hewlett Packard Journal, (date unknown).

"Amorphous-Silicon Thin-Film Metal-Oxide-Semiconductor Transistors", by Hiroshi Hayama and Masakiyo Matsumura, Applied Physics Letters, vol. 36, No. 9 (May 1980).

"Amorphous Silicon-Silicon Nitride Thin-Film Transistors" by M. J. Powel et al., Applied Physics Letters, vol. 38, No. 10 (May 1981).

"Application of Amorphous Silicon Field Effect Transistors in Addressable Liquid Crystal Display Panels" by A. J. Snell et al., Applied Physics, vol. 24, pp. 357–361 (1981).

(List continued on next page.)

Primary Examiner—Stanley D. Miller
Assistant Examiner—Anita Pellman Gross
Attorney, Agent, or Firm—Marvin Snyder; James C. Davis, Jr.

[57] ABSTRACT

Light blocking spacer material is disposed so as to at least partially cover the data and/or gate lines in a variety of liquid crystal display (LCD) devices. The material prevents spurious visual information from being displayed as a result of high RMS supply voltages applied to the data lines, such voltages acting to switch liquid crystal material at inopportune times and to thus degrade the displayed image. The light blocking material also enhances the displayed image by acting as a spacer between the front and back LCD device panels to insure uniform cell spacing. Light blocking material is also employed at the same time to prevent light from reaching light sensitive thin film field effect transistors (FETs) which operate to switch each cell or to establish gray levels therein. The light otherwise has a tendency to discharge the LCD cell, also hampering device function.

36 Claims, 8 Drawing Sheets

OTHER PUBLICATIONS

"A TFT-Addressed Liquid Crystal Color Display" by M. Sugata et al. (Oct. 1983), Proceedings of the Third International Display Research Conference, Paper No. 53.

"Amorphous-Silicon TFT Array for LCD Addressing" by M. V. C. Stroomer, Electronic Letters, vol. 18, No. 20 (1982).

"High Resolution Transparent—Type a-Si TFT LDCs" by K. Suzuki et al., *SID Digest*, (1983).

"Promise and Challenge of Thin-Film Silicon Approaches to Active Matrices" by A. I. Lakatos, 1982 International Display Research Conference, IEEE, pp. 146–151.

"Application of Amorphous Silicon Field Effect Transistors in Integrated Circuits" by A. J. Snell et al., *Applied Physics*, vol. A26, pp. 83–86.

M. Sugata et al., "A TFT-Addressed Liquid Crystal Color Display", Proceedings of the Third International Display Research Conference, Paper No. 53 (Oct. 1983).

LIGHT BLOCKING AND CELL SPACING FOR LIQUID CRYSTAL MATRIX DISPLAYS

This application is a continuation of application Ser. No. 240,366, filed Aug. 30, 1988, now abandoned, which in turn is a continuation of application Ser. No. 756,909 filed July 19, 1985 and now abandoned.

BACKGROUND OF THE INVENTION

The present invention is generally directed to the construction of liquid crystal display devices. More particularly, the present invention is directed to a liquid crystal display structure which incorporates spacer material which also performs a light blocking function.

A liquid crystal display device typically comprises a pair of flat panels sealably containing a quantity of liquid crystal material. These liquid crystal materials typically fall into two categories: dichroic dyes in a guest/host system or twisted nematic materials. The flat panels generally possess transparent electrode material disposed on their inner surfaces in predetermined patterns. One panel is often covered completely by a single transparent "ground plane" electrode. The opposite panel is configured with an array of transparent electrodes, referred to herein as "pixel" (picture element) electrodes. Thus, the typical cell in a liquid crystal display includes liquid crystal material disposed between a pixel electrode and a ground electrode forming, in effect, a capacitor-like structure disposed between transparent front and back panels. In general, however, transparency is only required for one of the two panels and the electrodes disposed thereon.

In operation, the orientation of liquid crystal material is affected by voltages applied across the electrodes on either side of the liquid crystal material. Typically, a voltage applied to the pixel electrode effects a change in the optical properties of the liquid crystal material. This optical change causes the display of information on the liquid crystal display (LCD) screen. In conventional digital watch displays and in newer LCD display screens used in miniature television receivers, the visual effect is typically produced by variations in reflected light. However, the utilization of transparent front and back panels and transparent electrodes also permit the visual effects to be produced by transmissive effects. These transmissive effects may be facilitated by separately powered light sources for the display, including fluorescent light type devices. LCD display screens may also be employed to produce color images through the incorporation of color filter mosaics in registration with the pixel electrode array. Some of these structures may employ polarizing filters to either enhance or provide the desired visual effect.

Various electrical mechanisms are employed to sequentially turn on and off individual pixel elements in an LCD display. For example, metal oxide varistor devices have been employed for this purpose. However, the utilization of thin film semiconductor switch elements is most relevant herein. In particular, a preferable switch element comprises a thin film field effect transistor (FET). These devices are preferred in LCD displays because of their potentially small size, low power consumption, switching speeds, ease of fabrication, and compatibility with conventional LCD structures. However, some semiconductor switch devices, notably thin film FETs, exhibit an undesirable degree of light sensitivity. This is undesirable because the nature of the device typically requires either ambient light or a built in light source. These light sources can act to cause charge leakage between the ground plane and the pixel electrodes. This produces undesirable visual effects on the display screen.

More particularly, amorphous silicon FET addressed liquid crystal matrix displays provide an attractive approach to high contrast, flat panel television type displays. Ideally, in an FET addressed LCD device, when the FET is turned on, the "liquid crystal capacitor" charges to the data or source line voltage. When the FET is turned off, the data voltage is stored on the liquid crystal capacitor. Amorphous silicon FETs however, are very photosensitive. Light absorbed in the channel region of the FET causes a leakage current to flow between the source and the drain. This leakage current causes the voltage stored on the liquid crystal capacitor to change, thereby degrading display performance. Since displays are often required to operate in high ambient light conditions, a means of keeping the light from affecting the FET is required. In conventional FET structures, a metallic gate electrode is formed on a transparent substrate. This gate electrode prevents light from reaching the FET channel region from the substrate side. In order to block light from the opposite (top side) an additional structure is required. Previously employed mechanisms to accomplish this have included the formation of a second gate electrode. However, this solution adds undesirable complexity to the structure. Additionally, other solutions employed have included the use of an electrically floating metal layer spaced above the FET channel and separated by a thick insulation layer. However, this adds unwanted capacitance between the source and drain. Even further attempts at solving light blocking problems have included the use of polymer material, but such material has not been employed anywhere except in the region of the FET device and certainly has not been employed to function as a spacer. Accordingly, an insulating, light blocking layer that does not add process complexity is desired.

In order to achieve uniform optical appearance, the thickness of an LCD cell, which is typically 3 to 15 microns, must be uniform over the cell to within ±0.2 microns. Since low cost glass materials desired for use in such displays may deviate from flatness by tens of microns over the dimensions of a display, spacers must be distributed throughout the cell. The two walls of the cell are then forced into contact with the spacers by filling the cell with the volume of liquid crystal material that just fills the cavity when the walls are in such contact. Spacers typically used are short lengths of glass fibers distributed randomly over the cell. With an FET driven LCD, the thickness of the FET structure may be about 1 micron. If a fiber spacer were to land on the FET, the cell thickness would locally be greater than if the fiber landed elsewhere. Therefore, a structure is required with the cell spacers located only at predetermined locations.

The pixel elements in an LCD are typically arranged in a rectangular array of rows and columns. Each pixel electrode is associated with its own FET switch device. Each switch device is connected to a data line and a gate line. Electrical signals applied simultaneously to each of these lines permit each pixel to be addressed independently. Accordingly, the LCD is typically provided with a set of parallel data lines which can be made to address cells in a horizontal direction. Likewise, gate lines are provided for accessing cells in a vertical direction. In operation, the image on the LCD device may be refreshed at a rate which is typically approximately 60 Hz.

However, a third problem arises with respect to areas of the LCD device near the data lines of the matrix. If most of the display elements along data lines are on, then the rms voltage appearing on the data line is approximately the same as the supply voltage, $V_0$. This voltage on the data line tends to turn on the liquid crystal material near the data line. Accordingly, the present invention is directed to a structure for blocking this unwanted light transmission by covering the region of the cell adjacent to the data line with a light blocking layer which also provides a spacing function and simultaneously provides a process structure which provides light blocking for the semiconductor switch devices.

SUMMARY OF THE INVENTION

In accordance with a preferred embodiment of the present invention, a liquid crystal display comprises a pair of flat substrates with at least one of them being transparent. A quantity of liquid crystal material is disposed and contained between the substrates. An array of pixel electrodes is disposed on at least one of the substrates. At least one ground plane electrode is disposed on the other of the substrates so that liquid crystal material is disposed between the pixel electrodes and any ground plane electrodes. Either the array of pixel electrodes comprise transparent material or the ground plane electrode or electrodes comprise transparent material. In a see-through embodiment of the present invention, both substrates, the ground plane electrode, and the array of pixel electrodes comprise transparent conductive material such as indium tin oxide (ITO). An array of semiconductor switch elements is associated with each pixel electrode. A set of electrically conductive data lines and a set of electrically conductive gate lines are provided and configured with the switch elements so that voltages appearing on the data line are applied to select pixel electrodes. Most relevantly with respect to the present invention, light blocking spacer material is disposed between the substrates and disposed so as to at least partially cover either the data lines or the gate lines. In a preferred embodiment of the present invention, light blocking material also is disposed so as to prevent light from reaching the semiconductor switch elements. In a preferred embodiment of the present invention, the light blocking material comprises a cured polyamic acid polymer material. Alternatively, the light blocking spacer material may be disposed on a color filter which is in registration with the data lines or gate lines. In preferred embodiments of the present invention, the spacer material is applied so as to at least partially cover the data lines. Furthermore, in preferred embodiments of the present invention, the semiconductor switch elements comprise thin film FET devices.

Accordingly, it is an object of the present invention to provide a mechanism and structure for spacers in liquid crystal display devices.

It is also an object of the present invention to provide light blocking material for light sensitive semiconductor switch elements employed in LCD devices.

It is yet another object of the present invention to provide a light blocking coating for the data lines in an LCD display.

Lastly, but not limited hereto, it is an object of the present invention to provide improved LCD device structures for flat panel monochrome and color screens employing various liquid crystal materials with and without the utilization of one or more light polarizers.

DETAILED DESCRIPTION OF THE INVENTION

Figure 1:
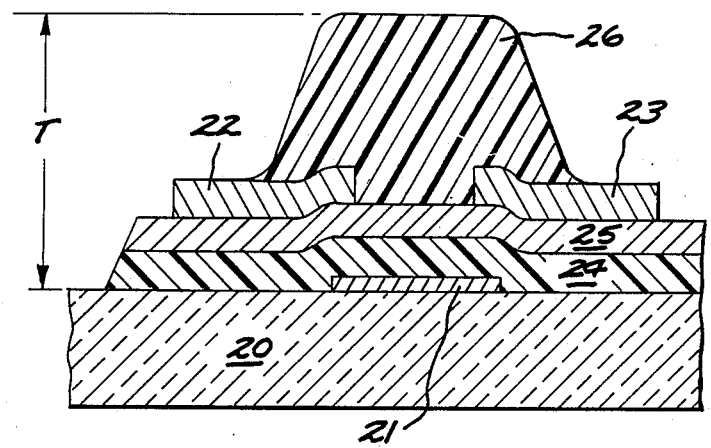
FIG. 1 is a cross sectional side elevation view illustrating a thin film FET with a light blocking structure.

FIG. 1 illustrates, in cross section, one method used in the present invention for preventing light from reaching the channel region of a thin film FET device. In particular, substrate 20 typically comprises a transparent material such as glass. In accordance with photopatterning methods, metal gate electrode 21 is affixed to this substrate. A patterned layer of insulating material 24 such as silicon nitride is then typically deposited so as to cover gate electrode 21 and to extend a certain distance on either side thereof. An active layer of amorphous silicon 25 is then typically applied and doped with appropriate polarity dopants to produce a channel region wherein current flow is controlled by electrical signals applied to the gate electrode. In a similar fashion, source and drain electrodes 22 and 23, respectively, are deposited using photopatterning methods to complete the formation of a thin film FET device. However, as described above, the channel region in layer 25 between source 22 and drain 23 is light sensitive. Accordingly, LCD devices of the present invention employ a light blocking polymer layer 26 to prevent light (from one side of the panel) from reaching the channel region. In the present invention, polymer material 26 is sufficiently thick so as to function as a spacer to establish the cell thickness T, as shown. Light is prevented from reaching the other side of the channel by means of non-transparent gate electrode 21. It is noted, however, that the opacity of gate material 21 is not a significant limitation since the gate electrode may only be approximately 10 microns in width and therefore essentially invisible to the viewer. In contrast, the pixel electrodes are by far the larger elements in an LCD device cell. The pixel electrodes approximately 0.01 inches square.

Figure 2:
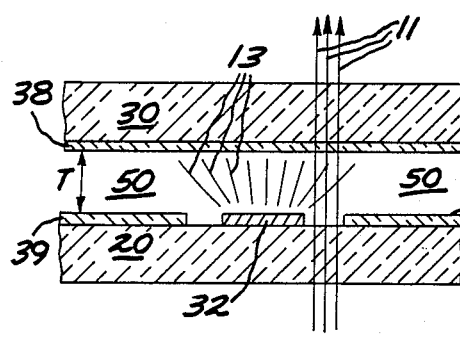
FIG. 2 is a cross sectional side elevation view illustrating the problems of unwanted light transmission and extraneous signals present on the data lines.

Furthermore, application of light blocking material limited to the semiconductor switch area, does not address the problem of sporadic switching of the liquid crystal material in the area of the data lines. This problem is particularly illustrated in FIG. 2. In particular, there is shown therein transparent substrates 20 and 30 between which liquid crystal material 50 is disposed. Transparent pixel electrodes 39 are seen disposed on either side of data line 32. Also, transparent ground plane electrode 38 is seen disposed on the interior surface of substrate 30. Substrates 20 and 30 form the front and back walls of the LCD panel. In general, it is desirable to be able to switch the orientation of liquid crystal material 50 in the region between pixel electrodes 39 and ground plane electrode 38. It is noted that while only a single ground plane electrode may be employed and that it is preferable to do this, it is also possible to employ multiple ground planes to achieve different visual effects. However, FIG. 2 illustrates the fact that voltages applied to data line 32 may be sufficient to cause realignment of material between data line 32 and ground plane 38, thus causing the switching of this material as illustrated by lines 13. This is an undesirable effect which is eliminated by the practice of the present invention. Additionally, in those situations in which substrates 20 and 30, ground plane 38, and pixel electrodes 39 comprise transparent material, it is generally undesirable to permit the passage of light through the display panel in an uncontrolled fashion as occurs in the gap between the data lines and the pixel electrodes. This undesired light transmission is indicated by arrows 11. This light transmission problem is also a problem that is solved by the practice of the present invention.

Figure 3:
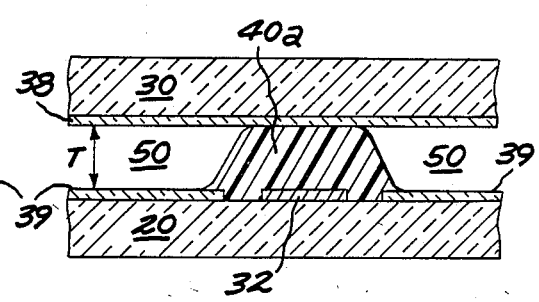
FIG. 3 is a cross sectional side elevation view illustrating a portion of one embodiment of the present invention in which a light blocking structure is employed to at least partially cover the data lines.

FIG. 3 illustrates one embodiment of the present invention which operates to alleviate the light blocking and transmission problems and at the same time provides a uniform spacer material so as to establish a uniform distance between substrates 20 and 30. Material 40a is a photopatternable polymer layer preferably containing black pigments or dyes. An example of such a material (but not limited thereto) is a mixture of a polyamic acid, a solvent and suspended black pigments. A suitable solvent is n-methyl pyrrolidone. This mixture is spin coated onto an FET substrate with a thickness determined by the required cell spacing. After drying, such as by solvent evaporation, the material is overcoated with a positive photoresist, such as Shipley 135OJ. The photoresist is exposed to the desired pattern and then developed. The photoresisted developer also dissolves unwanted polyamic acid under the exposed photoresist. The photoresist is then removed and the polyamic acid is cured at a temperature of approximately 250° C., converting it to a polyimide polymer. The desired properties of this layer include an optical density greater than 3 for a 6 micron thick layer. It is also desirable that this material have a sufficiently high resistivity, for example, a resistivity greater than $10^{10}$ ohm-cm. A commercially available material that meets these requirements is PTX-206 produced by Polytronics Inc. of Richardson, Texas. By patterning the light blocking layer such that it remains over the FET channel and over the data lines, the above photopatternable light blocking problems and distributed cell spacer problems are solved.

Figure 4A:
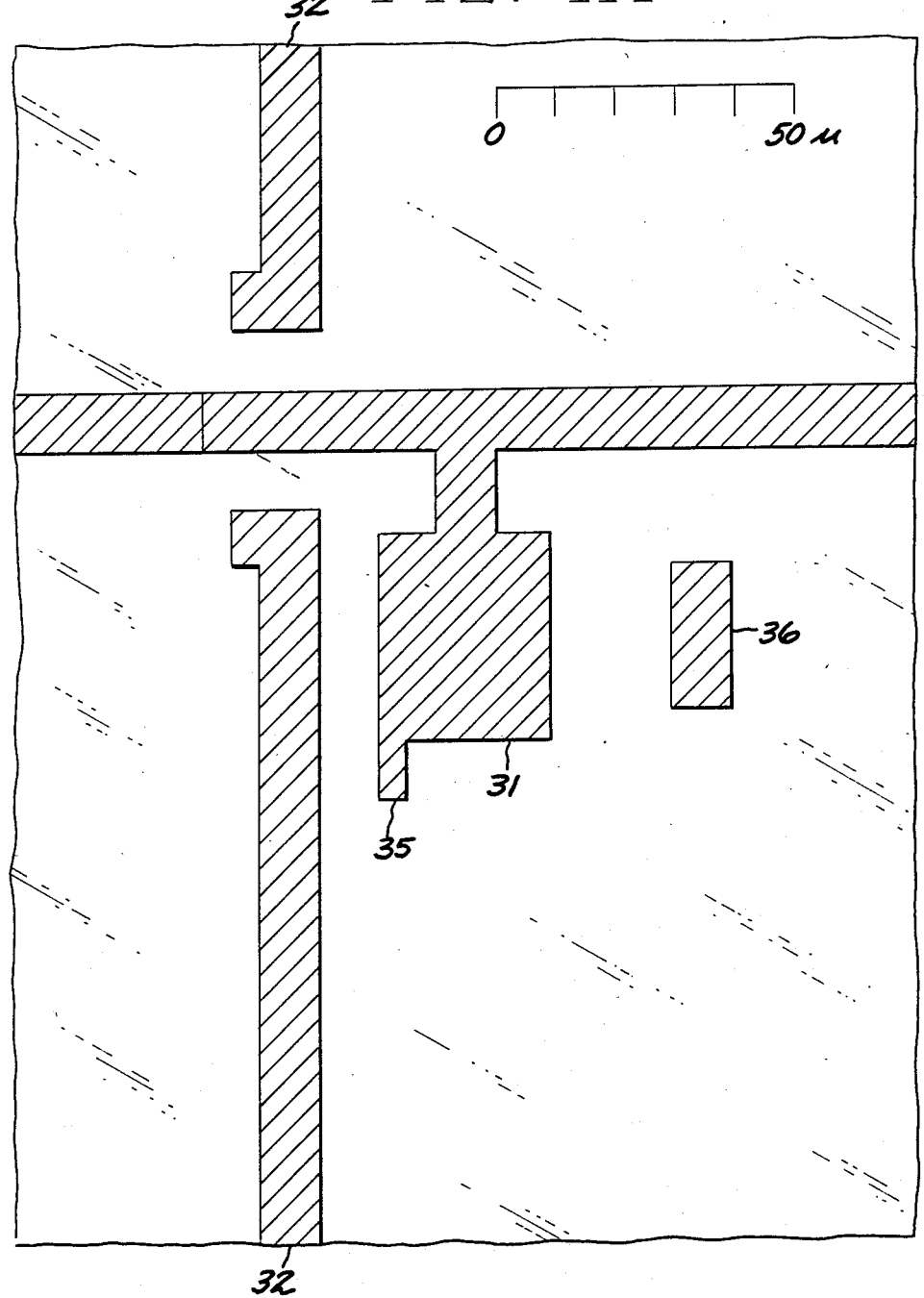
FIG. 4A is a plan view illustrating a gate metal pattern employed in a preferred embodiment of the present invention.
Figure 4B:
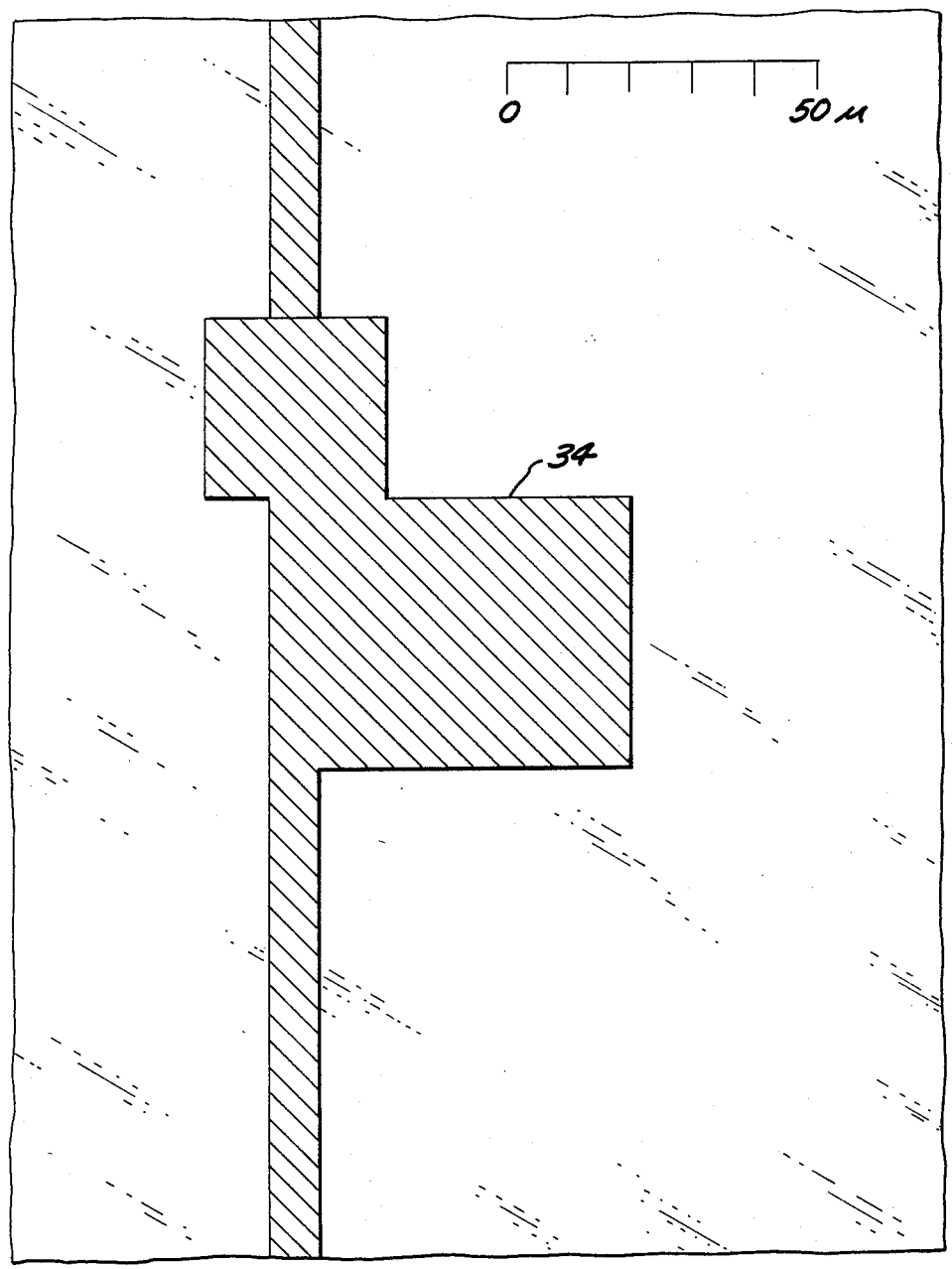
FIG. 4B is a plan view illustrating a pattern for gate insulation and active silicon as part of a thin film FET.
Figure 4C:
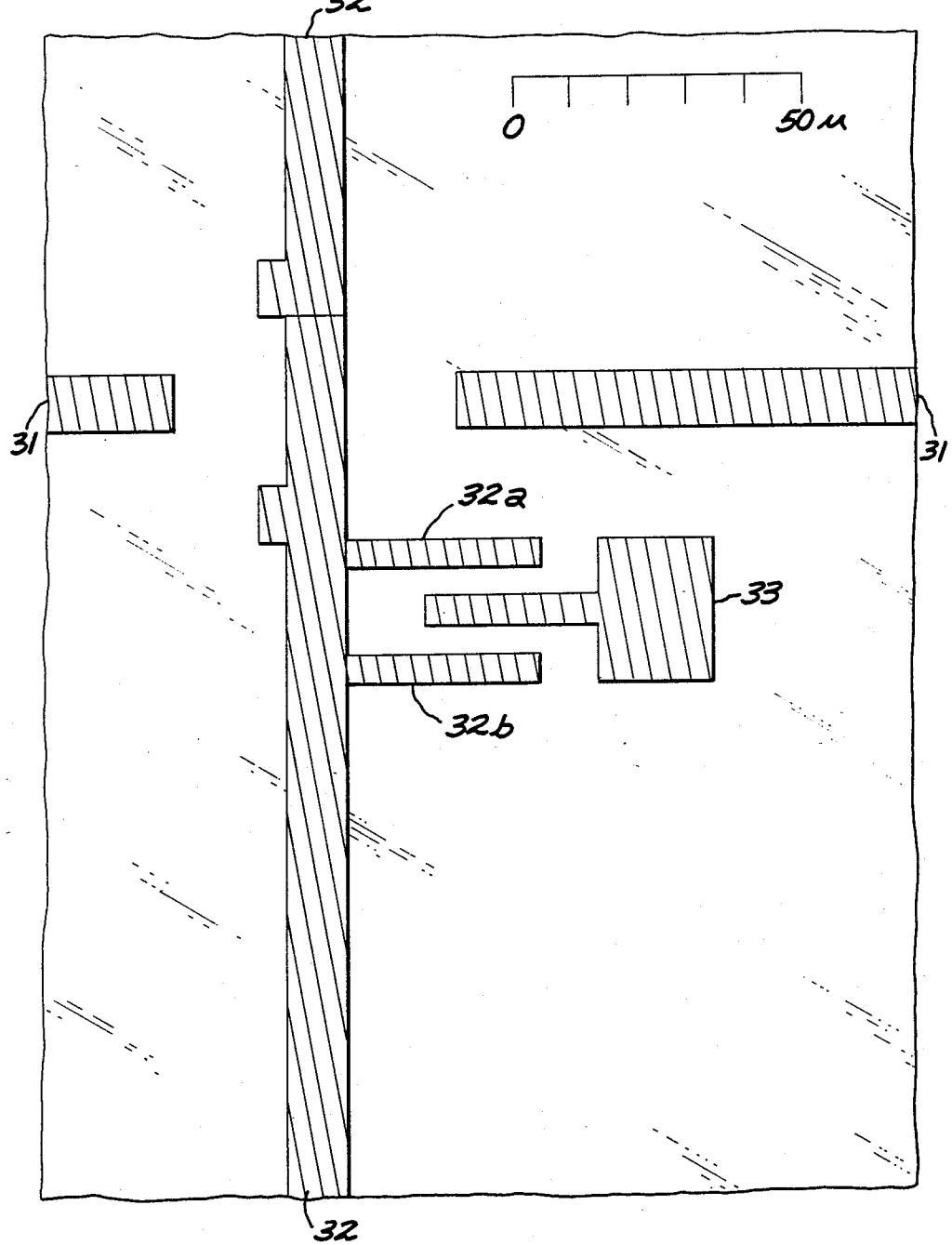
FIG. 4C is a plan view illustrating a metal pattern for source and drain electrodes and data lines.

FIGS. 4A–4E are layout patterns employable in the fabrication of the present invention. FIG. 4A illustrates a pattern for gate metal and associated horizontal gate drive lines 31. A scale is provided for reference. Additionally, FIG. 4A illustrates the presence of redundant data line 32. These lines are redundant in the sense that they do not form a complete electrical circuit in the layer shown but instead partially duplicate data line paths which ar completed in whole in another layer as shown in FIG. 4C. Nonetheless, connection is provided to complete the data line circuit, as shown in FIG. 4C. The metallization layer shown in FIG. 4A is opaque so as to prevent light from reaching the channel regions from one side of the display. The channel regions are formed above the large rectangular area shown in FIG. 4A. This rectangular area is also provided with tab 35 which acts to reduce photocurrents in the semiconductor devices formed. This occurs by inhibiting photo-induced conduction between source and drain electrodes. Metallic pad 36 is also shown in the layer illustrated in FIG. 4A. Pad 36 facilitates electrical connection between the device drain and the pixel electrode.

After the metallization layer of FIG. 4A is formed on an opaque substrate or on a transparent substrate such as glass, the pattern of FIG. 4B is employed in the deposition of insulating and semiconducting layers. In particular, a layer of silicon nitride or other insulating material is deposited in the pattern shown in FIG. 4B. The insulating material pattern shown in FIG. 4B serves several purposes. Firstly, this pattern provides gate insulating material for thin film FET devices. Secondly, this insulating layer is disposed so as to electrically insulate the gate lines from the data lines. Lastly, it is noted that the vertical portions extending upwardly and downwardly from the central patch region of FIG. 4B overlie data lines 32 shown in FIG. 4A. However, it is noted that the insulating layer in FIG. 4B is narrower than data line 32 in FIG. 4A. This permits the formation of a partially redundant data line as shown in FIG. 4C. Because the width of insulating layer 34 in FIG. 4B is narrower, electrical contact is thereby permitted between the data line conductors shown in FIGS. 4A and the complete data line conductors shown in FIG. 4C, both of which are indicated by reference numeral 32.

As pointed out above, the pattern of FIG. 4B is employed to serve an additional function. In particular, it serves as a pattern for the deposition of a layer or layers of semiconductor material. In particular, it is preferable to employ a triple layer having the pattern shown in FIG. 4B. In this case, the lowermost (that is, first) layer comprises silicon nitride, the next layer comprises silicon, and the next layer comprises silicon doped with material so as to provide the layer with an $N^{30}$ polarity. These layers are formed using conventional thin film FET processing.

The next layer applied to the substrate is a metallization layer having the configuration illustrated in FIG. 4C. In particular, the finger projections 32a and 32b extend from data line 32. These projections form source electrodes for an FET pair. Metallization pattern 33 provides a common drain electrode for the FET pair formed. This drain electrode is ultimately connected to pixel electrode 39 shown in FIGS. 2, 3, 7, and 4D. It is also in electrical contact with pad 36 in FIG. 4A. Data line 32 is connected to source electrodes 32a and 32b and in addition, because of the narrower width of insulating layer of FIG. 4B, data line 32 is in contact with the partially redundant data line having the same reference numeral in the layer of FIG. 4A. This provides a redundant structure for increased display reliability. It is also noted that gate line 31 is provided with enhanced metallization from the layer of FIG. 4C, again to provide enhanced display reliability.

Figure 4D:
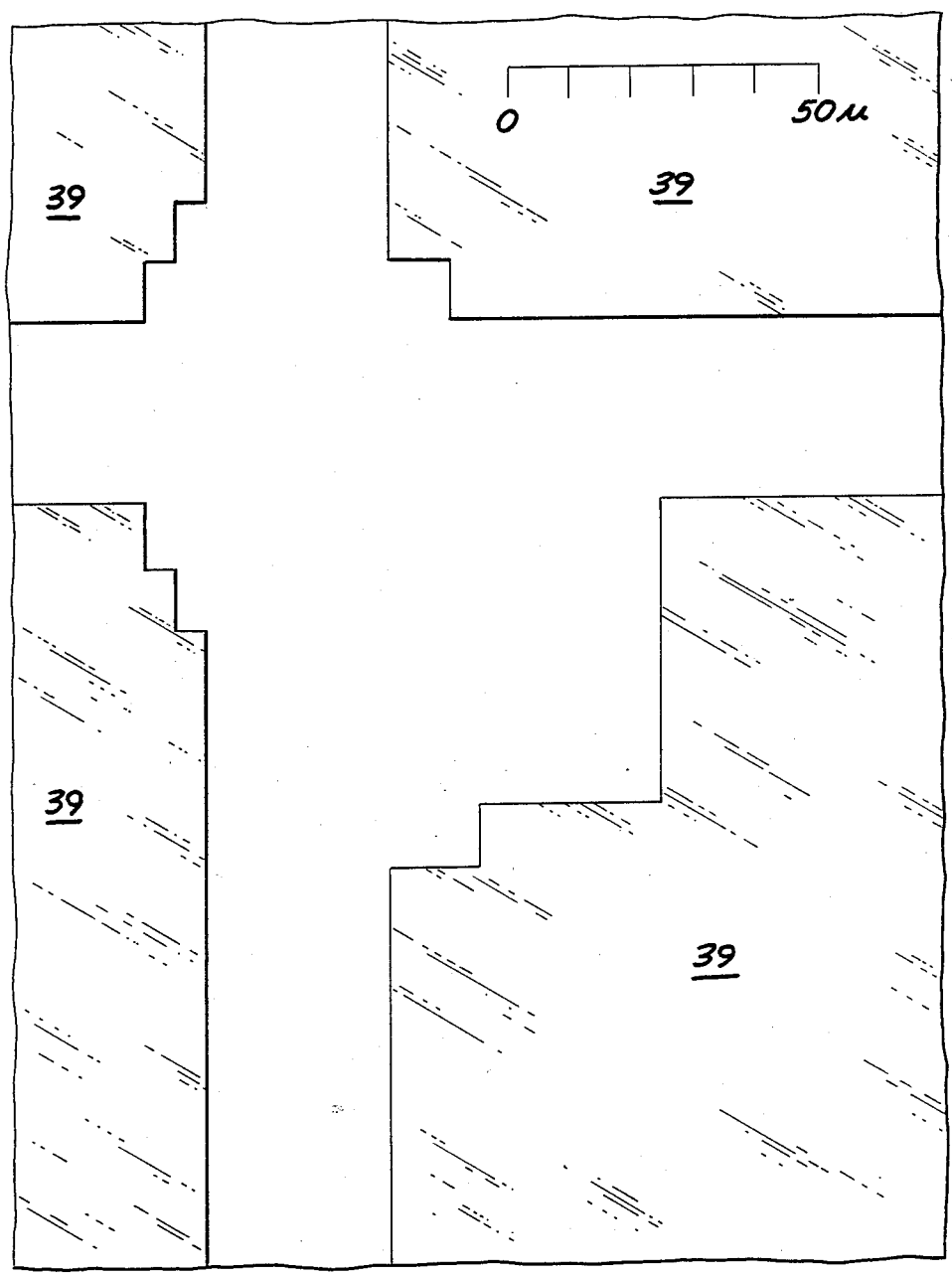
FIG. 4D is a plan view illustrating a pattern of pixel electrode material in the neighborhood of a thin film semiconductor switch device.

The next layer to be applied is the layer of pixel electrode patterns. The pixel electrodes must necessarily comprise electrically conductive material. However, depending upon the specific nature of the LCD device, the electrically conductive material may or may not be transparent. However, for transparency, indium tin oxide is preferably employed for this purpose. Accordingly, although pixel electrodes 39 comprise electrically conductive material, they are hatched as glass in figures herein to suggest their potentially transparent nature. It is, of course, required that either the ground plane electrodes or the pixel electrodes, or both, comprise transparent material. If they are both opaque, the purpose of the display is defeated. With further reference to the pixel electrodes, it is noted that FIG. 4D illustrates the presence of 4 such pixel electrodes. However, the semiconductor switch is in fact associated with the pixel electrode in the lower righthand corner of FIG. 4D. This pixel electrode is in electrical contact with metal (drain) pad 33 in FIG. 4C.

Figure 4E:
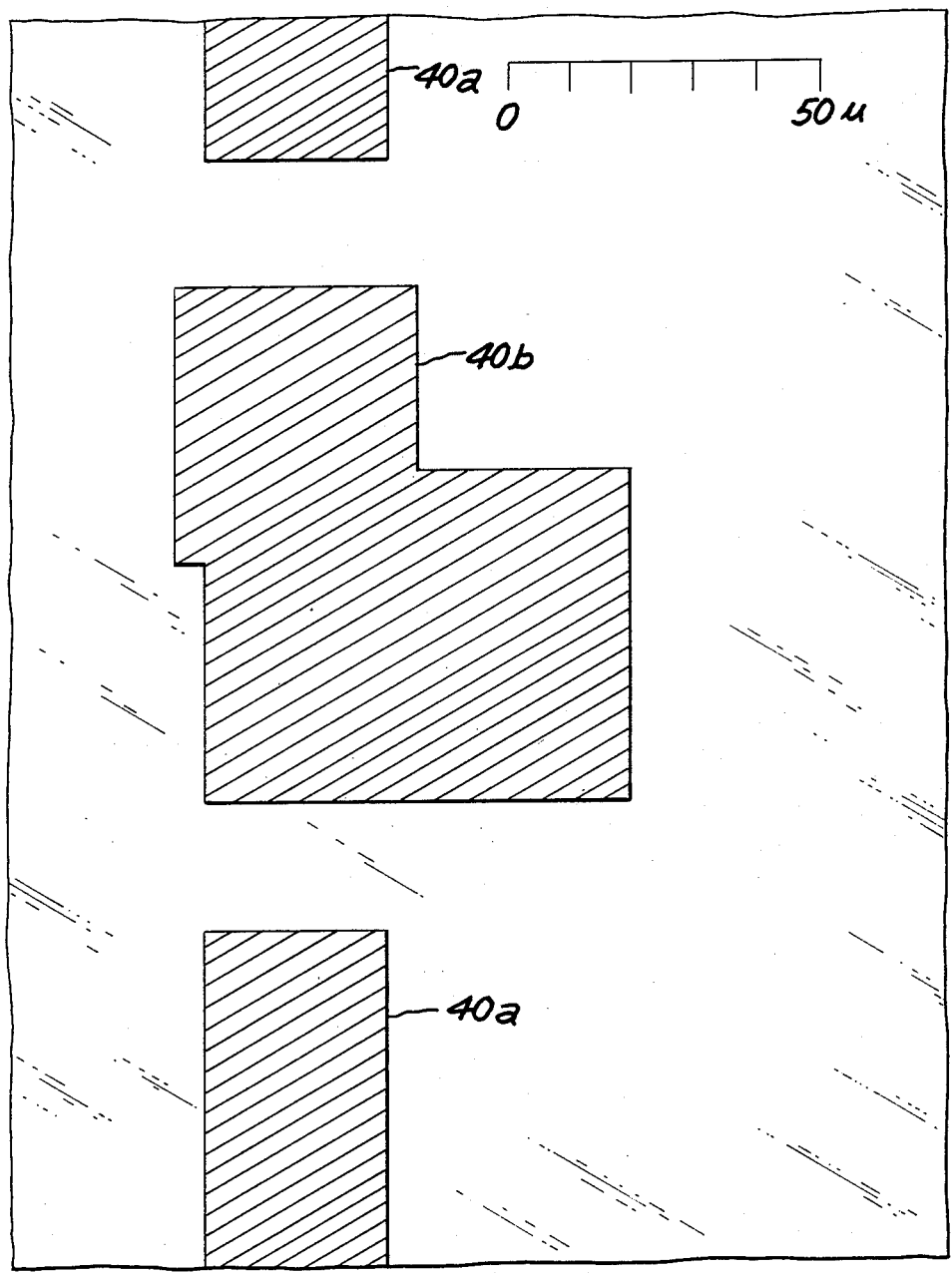
FIG. 4E is a plan view illustrating a pattern of polymeric light blocking material that may be employed in one embodiment of the present invention, notably as a partial covering for the data lines.

Most importantly, for the purposes of the present invention, FIG. 4E illustrates a pattern for present application of light blocking material. Light blocking material 40a is seen covering data lines 32 as described above. In a similar fashion, light blocking material 40b is also employed to prevent light from reaching the channel region of the FET pair formed at the upper lefthand corner of the pixel electrode in the lower righthand corner of FIG. 4D. In general, it is not necessary to provide similar light blocking material for the gate lines since these lines are generally do not have high enough rms voltage to activate the liquid crystal material in their vicinity. However, limited application of polymer material overlying the gate lines is useful in large area displays for improved spacer functioning. It is noted that light blocking material 40a applied in accordance with the pattern of FIG. 4E serves not only a light blocking function, but also serves as a spacer, as particularly illustrated in FIG. 3.

Figure 5:
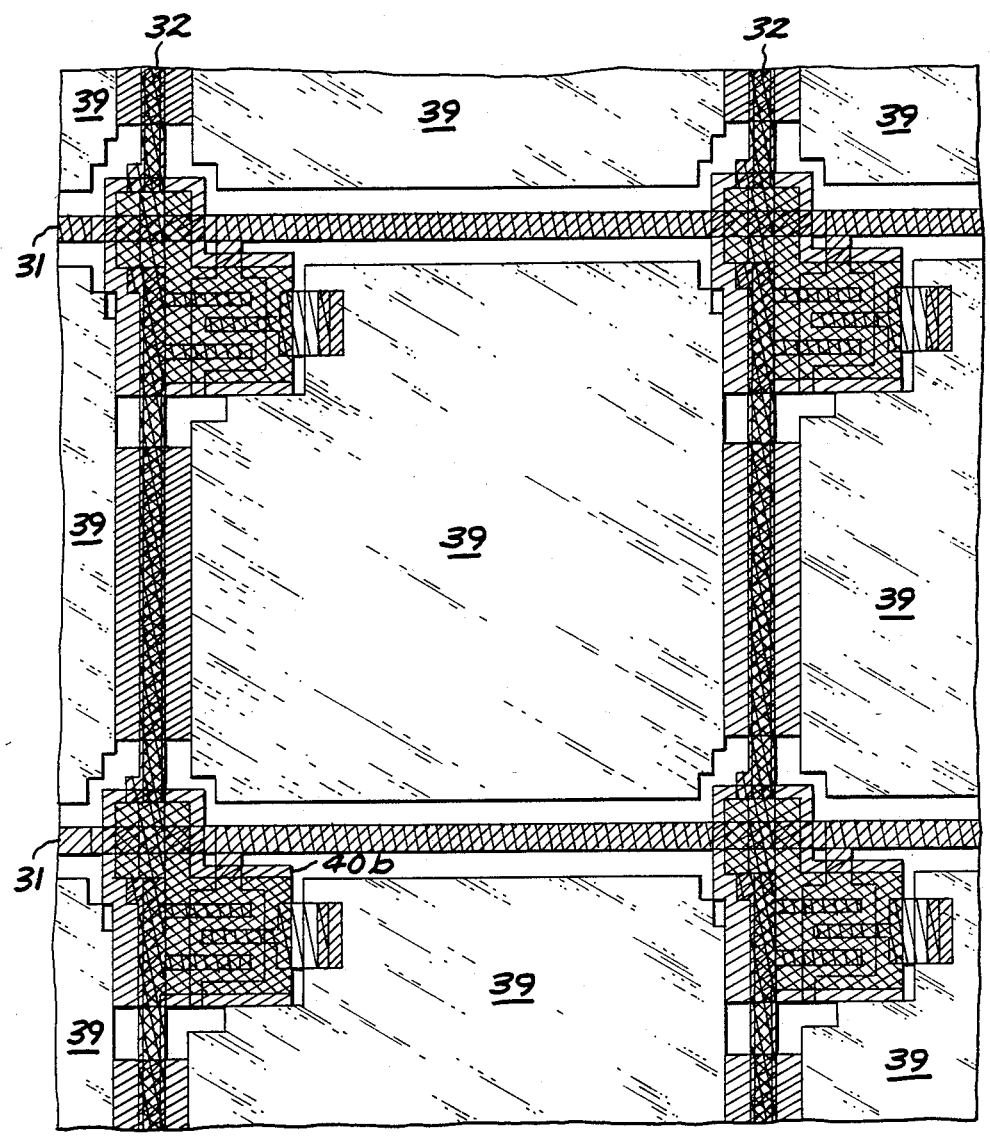
FIG. 5 is a plan view illustrating a portion of an LCD device made in accordance with the present invention.

FIG. 5 illustrates in an enlarged view, a single pixel cell and portions of the cells which surround it. The gate lines associated with the cells are shown extending in a horizontal direction. The data lines associated with the cells are shown extending in a vertical direction. It is noted, however, that the relative directionality of these lines is not fixed and that alternate configurations may be employed in which the horizontal and vertical roles are reversed. Additionally, each pixel cell is seen to be uniquely associated with a selected data line and gate line. Each pixel cell is seen to include a pixel electrode and its associated semiconductor switching device. The structure seen in FIG. 5 typically comprises one side of a liquid crystal display device. The other side typically comprises a ground plane electrode disposed on a transparent substrate. Liquid crystal material is disposed between the pixel electrodes and the ground plane electrode or electrodes. While the pixel cells shown in FIG. 5 are square, it is also possible to employ cells of differing shapes or varying sizes. Likewise, while the data lines and gate lines are shown extending in horizontal and vertical directions, it is also possible to employ data lines disposed so as to more closely resemble oblique coordinate systems. The pixel electrodes shown are approximately 0.01 inches square while the FET elements are approximately 0.001 inches square.

Figure 6:
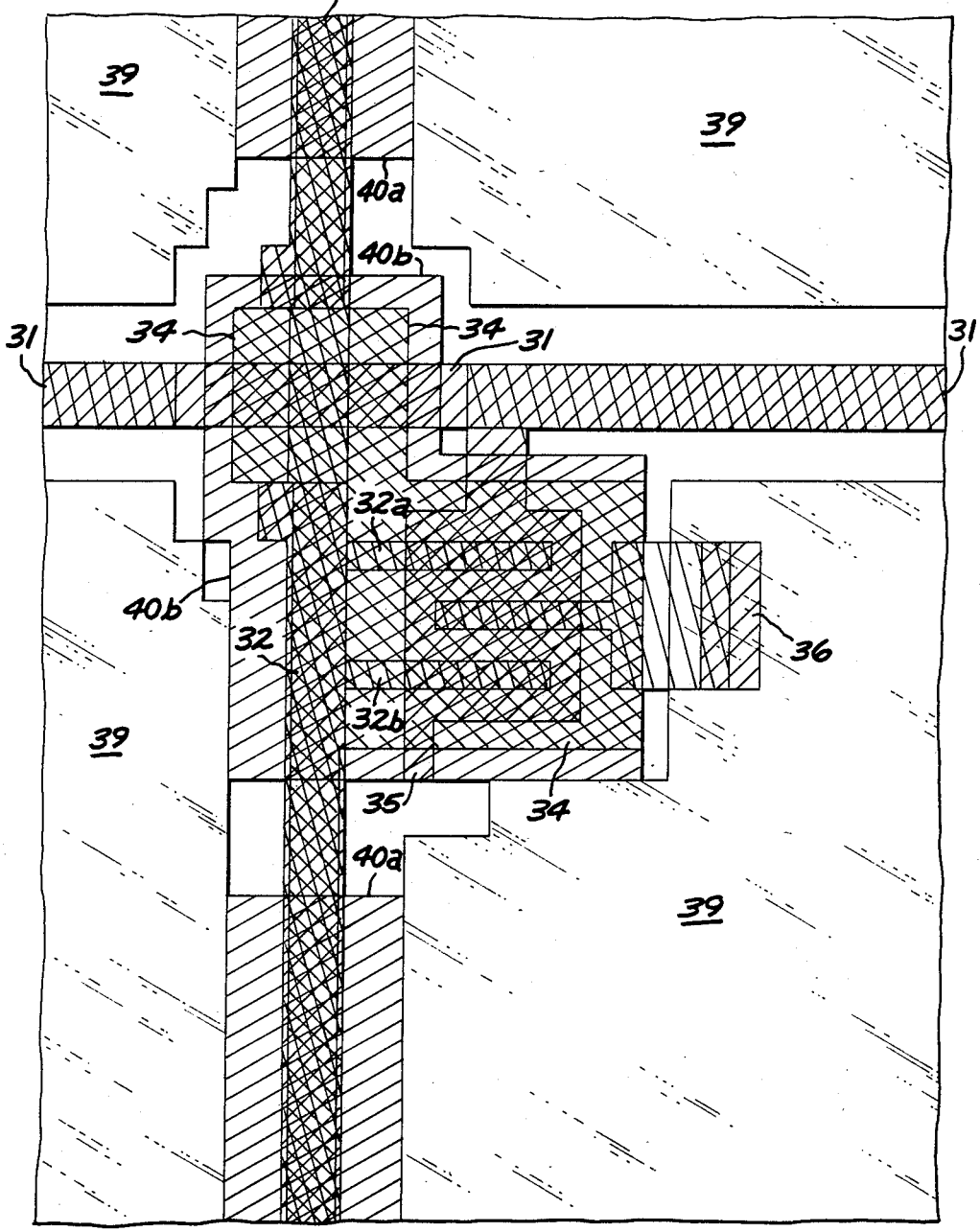
FIG. 6 is a plan view showing an enlarged portion of FIG. 5.

FIG. 6 provides a detailed view of the structure that results from the fabrication steps performed using the patterns shown in FIGS. 4A–4E. FIG. 6 provides an overview of the resulting structure and serves to more particularly describe interlayer structural relationships. In particular, the placement of light blocking material 40a and 40b is to be noted.

Figure 7:
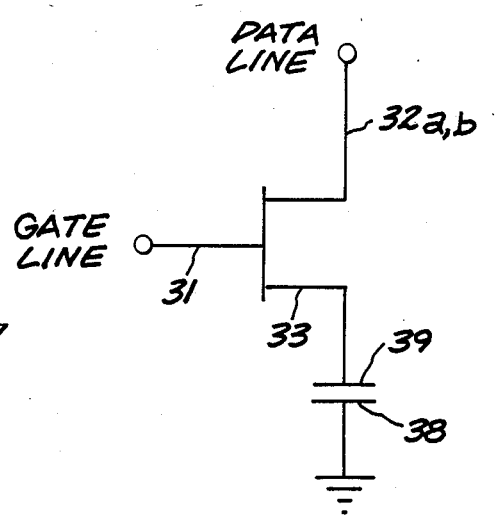
FIG. 7 is a schematic diagram illustrating an electrical model for the semiconductor switch devices associated with each pixel electrode.

FIG. 7 provides an electrical schematic diagram for a single pixel cell. In particular, a capacitor symbol with upper plate 39 and lower plate 38 is employed to represent and suggest the capacitor portion of the cell. Lower plate 38 typically comprises the ground plane electrode and upper plate 39 typically comprises the individual pixel electrodes. The pixel electrodes are electrically connected to drain 33 of the FET gate 31 and source electrodes 32a and 32b. The gate lines and data lines are as shown in FIG. 7. It should be noted, however, that references herein to source and drain electrodes are exemplary only. As is well known in the art, FET devices often exhibit symmetries in which source and drain designations exist only for convenience or as a result of external device connections.

It is also possible to fabricate liquid crystal display devices which display color images rather than monochrome ones. In such devices, a mosaic color filter is typically employed. This color filter is preferably disposed over the ground plane electrode. In accordance with the present invention, it is also possible to dispose spacer material on this filter. However, this is a less desirable arrangement for the reason that the color filter layer must be accurately registered and aligned with respect to the thin film transistor array and the associated pixel electrodes.

As indicated above, different forms of liquid crystal material may be employed in the present invention. In the event that twisted nematic materials are employed, a pair of polarizers are also required. These polarizers are typically disposed external to the walls of the LCD device which contain the liquid crystal material. In LCD devices employing dichroic dyes (guest/host systems), polarizer pairs are no longer required. In these embodiments, systems with either a single polarizer or no polarizers at all may be employed.

For devices produced in accordance with the present invention, it is desirable that the gate material be opaque in those systems in which the gate metal is disposed on a transparent substrate. Also, as used herein and in the appended claims, the term transparent does not require 100% optical transmission. Transparency sufficient to render LCD device images visible is the only requirement. For purposes of the present invention, materials which are nonconductive to light generally transmit less than 0.1% and possess an optical density of 3. This is sufficient for LCD devices in which the substrates are approximately 6 microns apart.

Accordingly, from the above, it may be appreciated that the liquid crystal display device of the present invention provides improved display performance and is compatible with conventionally employed LCD device fabrication methods. In particular it is seen that the present invention eliminates spurious switching of LCD material in the vicinity of the data lines while at the same time providing a spacing function which is achieved without compromising display performance or reliability. It is also seen that the light blocking function provided by the present invention facilitates the formation of high quality, high contrast images, even color images, by preventing undesirable levels of light from reaching FET channel regions.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A liquid crystal display comprising:
   a pair of flat substrate, at least one of which is transparent;
   a quantity of liquid crystal material disposed and contained between said substrates;
   an array of pixel electrodes disposed on said at least one substrate;
   at least one ground plane electrode disposed on the other use of said substrates, so that liquid crystal material is disposed between said pixel electrodes and said ground plane electrode, with said at least one ground plane electrode and said array of pixel electrodes being transparent;
   an array of amorphous silicon semiconductor switch elements associated with said pixel electrodes;
   a set of electrically conductive data lines;
   a set of electrically conductive gate lines, said switch elements, said data lines and said gate lines being electrically connected to permit voltages appearing on said data lines to be applied to select pixel electrodes in accordance with signals present on said gate lines; and
   cured photopatterned polyimide light blocking spacer material disposed between said substrates so as to determine the distance between said substrates and disposed so as to block light from said semiconductor switch elements.

2. The display of claim 1 in which said light blocking spacer material is also disposed so as to at least partially cover said data lines or said gate lines.

3. The display of claim 1 in which said light blocking spacer material at least partially covers said gate lines.

4. The display of claim 1 in which said light blocking spacer material at least partially covers said gate lines.

5. The display of claim 1 in which said light blocking spacer material is in contact with both of said flat substrates.

6. The display of claim 1 in which said light blocking spacer material is formed on the same substrate as said semiconductor switch elements.

7. The display of claim 1 in which said light blocking spacer material is formed on a nontransparent one of said flat substrate.

8. The display of claim 1 in which said polyimide includes additional material selected from the group consisting of black pigments and black dyes.

9. The display of claim 1 in which said polyimide comprises cured polyamic acid.

10. The display of claim 1 in which the spacing between said flat substrates is approximately 6 microns.

11. The display of claim 11 in which said light blocking spacer material exhibits an optical density greater than 3.

12. The display of claim 1 in which said light blocking spacer exhibits a resistivity greater than $10^{10}$ ohm-cm.

13. The display of claim 1 in which said data lines are transparent.

14. The display of claim 1 in which said gate lines are transparent.

15. The display of claim 1 in which said semiconductor switch elements are light sensitive.

16. The display of claim 1 in which said semiconductor switch elements comprise field effect transistors having source, gate, and drain regions.

17. The display of claim 1 in which said semiconductor switch elements comprise thin film field effect transistors.

18. The display of claim 1 in which said transparent electrodes comprise indium tin oxide.

19. The display of claim 1 in which there is present only a single ground plane electrode.

20. The display of claim 1 in which both of said flat substrates are transparent.

21. The display of claim 1 in which said liquid crystal material is selected from the group consisting of dichroic liquid crystal material and twisted nematic liquid crystal material.

22. The display of claim 1 in which said pixel electrodes are approximately 0.01 inches square.

23. The display of claim 20 in which said semiconductor switch elements are approximately 0.001 inches square.

24. The display of claim 1 in which said light blocking spacer material is disposed on a color filter in registration with said pixel electrodes.

25. The display of claim 16 in which said drain regions are connected to said pixel electrodes.

26. The display of claim 1 further including a color filter in registration with said pixel cells.

27. The display of claim 1 further including a polarizer disposed external to and on opposite sides of said flat substrates and in which said liquid crystal material comprises twisted nematic material.

28. The display claim 1 further including a polarizer of disposed external to said flat substrates and in which the liquid crystal material comprises dichroic dye material, said polarizer being disposed so as not to be on a side of the display on which either the electrodes or the substrates on which the electrodes are disposed are opaque.

29. The display of claim 16 in which said gate lines comprise the same material as electrodes forming said FET gate regions.

30. The display of claim 1 in which said light blocking spacer material is disposed so as to prevent transmission of light in at least some locations between said pixel electrodes and either said gate lines or said data lines.

31. A liquid crystal display comprising:
   a pair of flat substrates, at least one of which is transparent;
   a quantity of liquid crystal material disposed and contained between said substrates;
   an array of pixel electrodes disposed on said at least one substrate;
   at least one ground plane electrode disposed on the other one of said substrate, so that liquid crystal material is disposed between said pixel electrodes and said ground plane electrode, with said at least one ground plane electrode and said array of pixel electrodes being transparent;
   an array of amorphous silicon semiconductor switch elements associated with said pixel electrodes;
   a set of electrically conductive data lines;
   a set of electrically conductive gate lines, said switch elements, said data lines and said gate lines being electrically connected to permit voltages appearing on said data lines to be applied to select pixel electrodes in accordance with signals present on said gate lines; and cured photopatterned polyimide light blocking spacer material disposed so as to at least partially cover said data lines or said gate lines.

32. The display of claim 31 in which said light blocking spacer material is disposed so as to prevent transmission of light in at least some locations between said pixel electrodes and either said gate lines or said data lines.

33. A liquid crystal display comprising:

a pair of flat substrates, at least one of which is transparent;

a quantity of liquid crystal material disposed and contained between said substrates;

an array of pixel electrodes disposed on said at least one substrate;

at least one ground plane electrode disposed on the other one of said substrates, so that liquid crystal material is disposed between said pixel electrodes and said ground plane electrode, with said at least one ground plane electrode and said array of pixel electrodes being transparent;

an array of amorphous silicon semiconductor switch elements associated with said pixel electrodes;

a set of electrically conductive data lines, each of said data lines being partially duplicated along its length, respectively, so as to form a redundant conductive structure;

a set of electrically conductive gate lines, said switch elements, said data lines and said gate lines being electrically connected to permit voltages appearing on said data lines to be applied to select pixel electrodes in accordance with signal patterns present on said gate lines; and cured photopatterned polyimide light blocking spacer material disposed so as to at least partially cover said data lines or said gate lines.

34. The display of claim 33 in which said light blocking spacer material is disposed so as to prevent transmission of light in at least some locations between said pixel electrodes and either said gate lines or said data lines.

35. A liquid crystal display comprising:

a pair of flat substrate, at least one of which is transparent;

a quantity of liquid crystal material disposed and contained between said substrates;

an array of pixel electrodes disposed on said at least one substrate;

at least one ground plane electrode disposed on the other one of said substrates, so that liquid crystal material is disposed between said pixel electrodes and said ground plane electrode, with said at least one ground plane electrode and said array of pixel electrodes being transparent;

an array of amorphous silicon semiconductor switch elements associated with said pixel electrodes;

a set of electrically conductive data lines, each of said data lines being partially duplicated along its length, respectively, so as to form a redundant conductive structure;

a set of electrically conductive gate lines, said switch elements, said data lines and said gate lines being electrically connected to permit voltages appearing on said data lines to be applied to select pixel electrodes in accordance with signal patterns present on said gate lines; and a cured photopatterned polyimide light blocking material disposed so as to at least partially cover said data lines or said gate lines.

36. The display of claim 34 in which said light blocking material is disposed so as to prevent transmission of light in at least some locations between said pixel electrodes and either said gate lines or said data lines.

* * * * *